United States Patent Office 3,042,049
Patented July 3, 1962

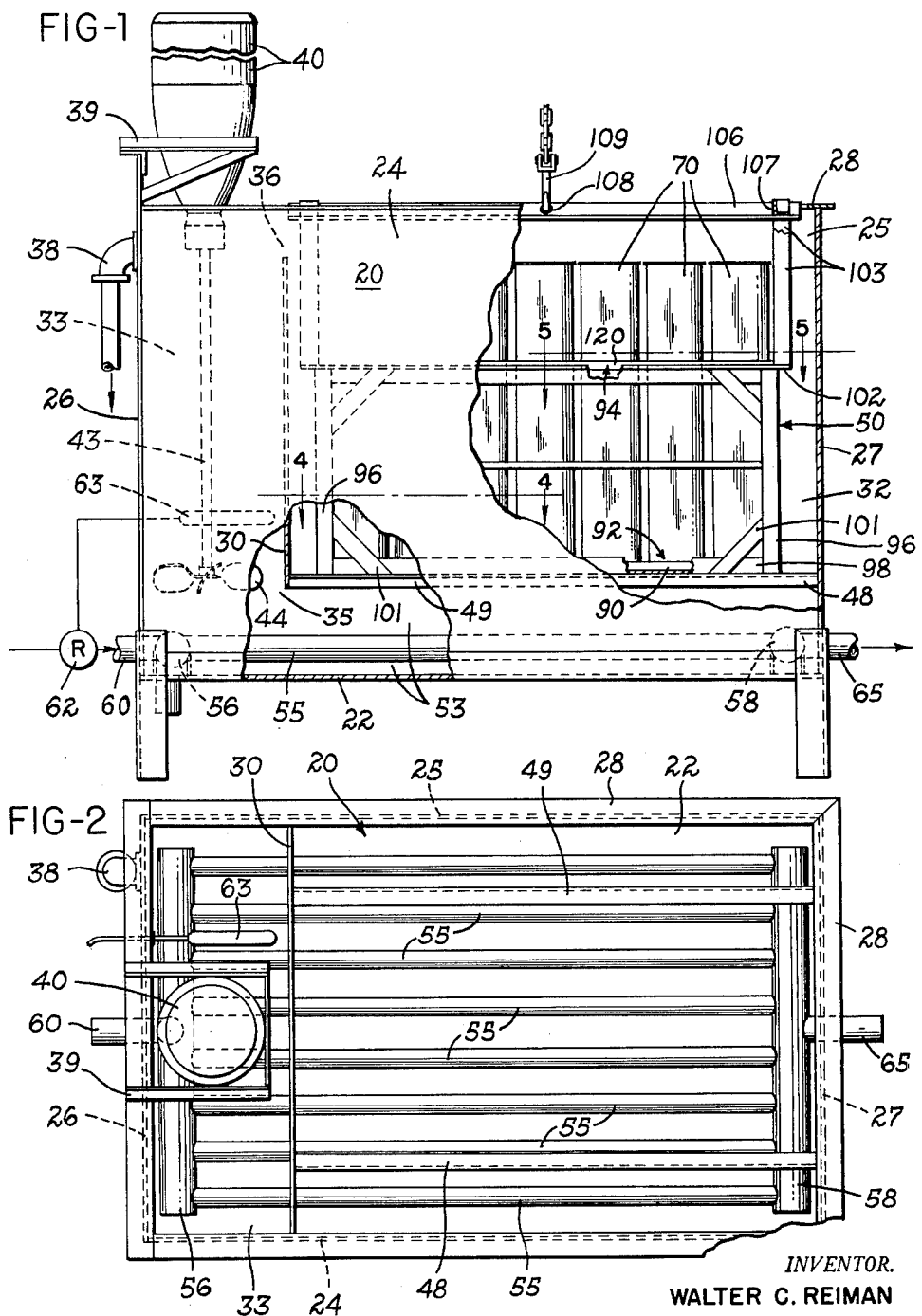

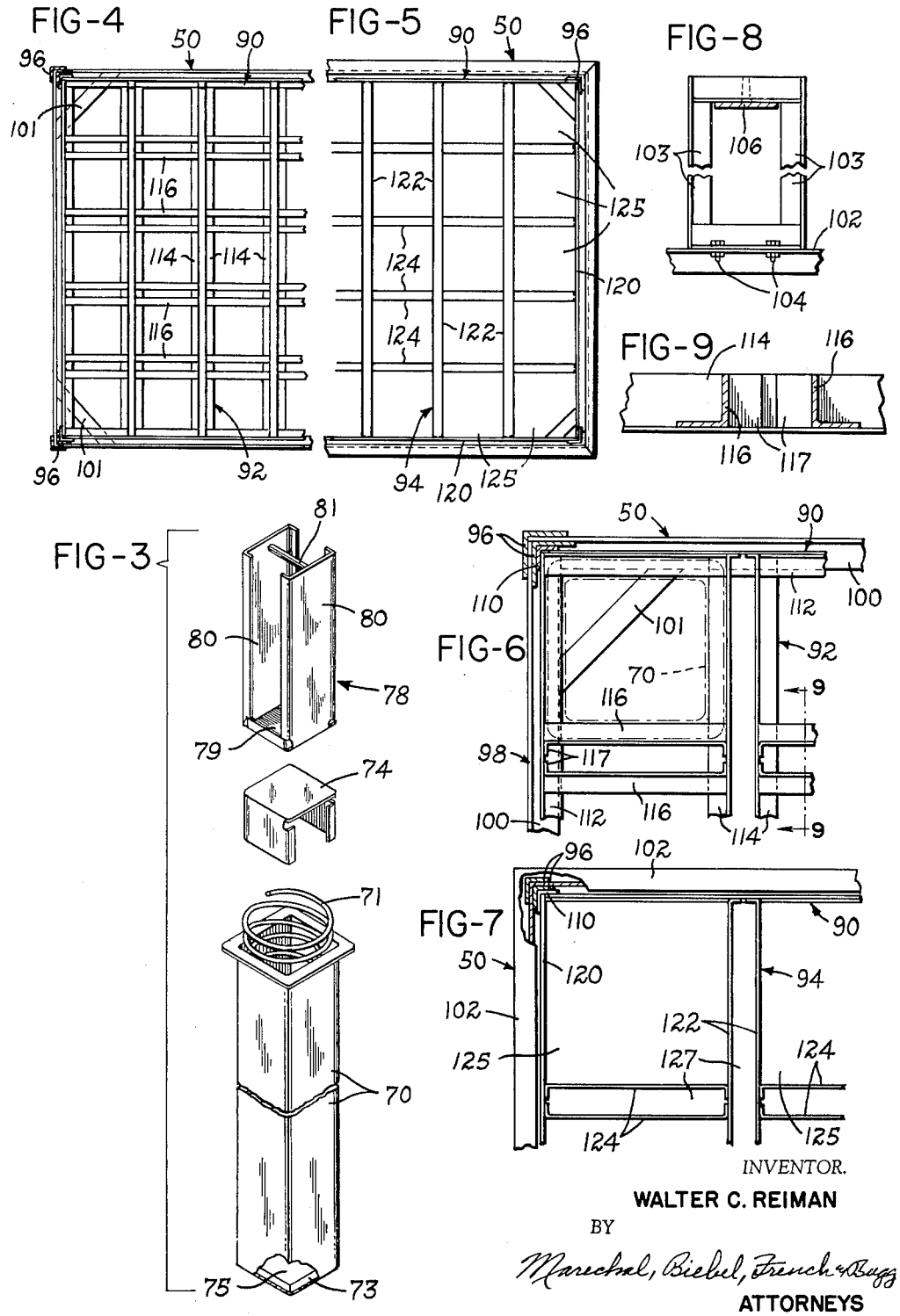

3,042,049
WASHING MACHINE
Walter C. Reiman, Troy, Ohio, assignor to The Braun Brothers Packing Company, Troy, Ohio, a corporation of Ohio
Filed Dec. 2, 1958, Ser. No. 777,718
5 Claims. (Cl. 134—108)

This invention pertains to washing machines and more particularly to machines for washing meat cooking molds and the like.

Certain varieties of pressed ham and prepared luncheon meat are cooked at the meat packing plant in long rectangularly shaped baking molds. The hand washing of such molds is both tedious and time consuming due to their rectangular shape and their high length-to-cross section ratio. As an example, two men commonly require four and one-half to five hours to hand wash 100 such molds. Ordinary spray washing machines have been found ineffective for thoroughly cleaning through the length of the molds and for removing particles of meat and fat that have been burned onto the metal.

In the present invention, the molds are placed into a suitable support frame and are submerged in a bath of hot circulating detergent liquid. The frame includes mold supporting members which provide spacing for the flow of cleaning fluid through and between the molds. The washing liquid is contained in a tank which is divided by a partition into a washing compartment and an impeller compartment. The washing compartment includes means for supporting the frame above the bottom of the tank to provide a space for the circulation of the washing liquid. A motor driven impeller is mounted within the impeller compartment and arranged to circulate the washing liquid into the space below the frame and upward through the molds over the top of the partition and back into the impeller compartment. Means are provided within the tank for the draining of surface foam and soap from the circulated liquid and for maintaining the washing liquid at a desired temperature.

It is therefore an object of this invention to provide a machine as outlined above for the submerged washing of meat cooking molds.

A further object of this invention is to provide a washing machine as outlined above having a tank divided into a washing compartment and an impeller compartment.

A still further object of this invention is to provide a machine for the washing of elongated meat cooking molds which includes a drain for the removal of surface foam.

Another object of this invention is to provide a machine as outlined above having a mold supporting inner frame carried within an outer lifting frame.

An additional object of this invention is to provide a machine as outlined above having a submersion tank for washing meat baking molds and including means for maintaining the temperture of the washing solution contained within the tank.

Other objects and advantages of the invention will be apparent from the following description, the accompanying drawings and the appended claims.

In the drawings—

FIG. 1 is an elevational view of the machine with a frame inserted and having a portion of the inner side wall broken away to expose details of the construction;

FIG. 2 is a plan view of the machine of FIG. 1 with the frame removed exposing details of the interior;

FIG. 3 is an exploded perspective view of a typical meat cooking pan assembly;

FIG. 4 is a fragmentary section of the mold support portion of the inner frame as received within the lifting frame, taken generally along line 4—4 of FIG. 1 with the molds removed;

FIG. 5 is another fragmentary section of the inner and outer frames showing the details of the spatial separating structure of the inner frame taken generally along line 5—5 of FIG. 1;

FIGS. 6 and 7 are enlarged fragmentary views of a portion of FIGS. 4 and 5, respectively;

FIG. 8 is a fragmentary end view of the lifting frame showing the lifting rails; and FIG. 9 is a sectional view taken generally along line 9—9 of FIG. 6.

Referring to the drawings, which illustrate a preferred embodiment of the invention, an open top submersion tank is shown generally at 20 as including a floor 22, side side walls 24 and 25 and end walls 26 and 27. The side and end walls are joined together at the top by a circumferential inwardly extended ledge 28 which adds rigidity to the tank structure.

The tank 20 includes means in the form of a partition 30 dividing the interior of the tank into a washing compartment 32 and an impeller compartment 33. The partition 30 is less than coextensive with the side walls 24 and defines with the floor 22 and opening 35 through which washing liquid may flow from the impeller compartment 33 into the washing compartment 32. Similarly, the partition 30 defines with the side walls 24 and 25 a liquid return path 36 over the top thereof for the return of washing liquid from the washing compartments 32 into the impeller compartment 33.

Means are provided in the tank 20 for the removal of foam and saponified fat particles from the surface of the washing fluid including a drain 38 formed within the end wall 26 in communication with the impeller compartment 33. The drain 38 is positioned in the wall 26 opposite the partition 30 to be in the path of flow thereover to receive the surface foam carried by the returning liquid. The drain 38 also defines the maximum level of the washing liquid within the tank 22. The end wall 26 also supports a bracket 39 upon which is mounted an impeller motor 40. The motor 40 has a shaft 43 extended within the compartment 33 into which an impeller 44 is attached for rotation by the motor 40 and arranged to direct fluid downwardly into the opening 35.

The tank 20 includes support means defining a space between a mold supporting structure and the tank floor 22 for the circulating of washing liquid thereunder in the form of a pair of support rails 48 and 49 extended from the partition 30 parallel to each other and to the floor 22 to the end wall 27. The rails 48 and 49 are arranged to support thereon a mold lifting frame 50 a fixed distance above the floor 22 defining thereby a space 53 for the flow of washing fluid from the compartment 33 through the opening 35.

Heat exchange means controlled by a regulator is included within the tank 20 through which the temperature of the washing fluid may be maintained at a desired level. This includes a plurality of steam pipes 55 mounted within the tank 20 adjacent the floor 22 between a transverse inlet header 56 and an outlet header 58. The inlet header 56 receives steam for heating the fluid within the tank through an inlet steam pipe 60 connected to a source of steam under pressure (not shown) through a regulator valve 62. The valve 62 includes a temperature sensing bulb 63 mounted within the impeller compartment 33 through the end wall 26. Spent steam and water are removed from the outlet header 58 through an outlet pipe 65.

FIG. 3 shows a typical mold which this machine is particularly adapted for washing, together with its associated parts which make up a complete baking pan assembly. The particular assembly illustrated is used for cooking boneless pressed hams. The outer rectangular mold 70 receives a compression spring 71 therein which drops within the mold and rests upon the inwardly turned flange 73. A combination spring cap and bottom plate 74 is dropped in on top of the spring 71 within the mold 70. A boneless ham (not shown) may now be brought into the mold 70 as by the application of vacuum through the bottom opening 75 to compress the ham against the bottom plate 74 and the spring 71. A top mold closing piece 78, including a flat bottom portion 79 and side walls 80 connected by a handle 81, is pressed down on the top of the ham and is secured in place by any suitable means to confine the ham within the mold 70 during the cooking process.

The frame 50 is receivable within the washing compartment 32 and includes means for the spatial separation and support of the mold cans 70 submerged below the level of the liquid as defined by the drain 38. Such means includes an inner frame 90 which is removably received within the lifting frame 50 and which includes a mold supporting structure 92 at the bottom and a spatial separating structure 94 at the top thereof. The lifting frame 50 includes substantially vertical corner members 96 formed of angle iron fixed to the four corners of a rectangular frame supporting bottom 98. The bottom 98 is also formed of angle iron and includes a bottom leg 100 extended inwardly for the support of the inner frame 90. The corners of the lifting frame 50 are strengthened by diagonal braces 101. The lifting frame further includes a circumferential outwardly extended ledge 102 to which a pair of oppositely disposed U-shaped lifting rails 103 are secured by bolts 104. A detachable lifting yoke 106 has end hook portions 107 for lifting engagement with the rails 103 and an eye 108 through which the hook 109 of a chain hoist may be received.

The inner frame 90 also has four substantially vertical corner members 110 formed of angle iron and receivable within the side members 96 of the lifting frame 50. An arrangement of welded angle iron comprises the mold supporting bottom 92 of the inner frame 90, and reference may be had to FIG. 6 for an enlarged detail of the assembly of the supporting bottom 92. As in the case of the lifting frame 50, the four corner members 110 are tied together on the four sides of the bottom by an angle iron frame member 112 running circumferentially around the frame 90. The bottom mold supporting structure 92 includes means for the support of individual molds in the form of a grid work of angle iron sections welded to each other and to the bottom frame members 112. These include spaced pairs of angle sections 114 placed back-to-back with a space therebetween and running across the bottom of the frame 90 in one direction. Welded to these sections 114 are a plurality of short angle sections 116 placed in pairs back-to-back with a space therebetween and with their ends 117 turned out for engagement with the sections 114, FIG. 9. These sections 114, 116 thereby define supports for the molds as shown by the broken outline in FIG. 6.

The corner members 110 are tied together at the top of the inner frame 90 by a circumferential metal strap 120. The top also includes the mold spatial separating structure 94 shown in enlarged detail in FIG. 7 as including pairs of straps 122 spaced from each other and running the width of the frame 90. Also, a plurality of transverse strap sections 124 are arranged in pairs to define spaces or compartments 125 through which a mold 70 may be inserted and to define spacings 127 between the pairs of strap sections 124 for the free flow of washing liquid on the outside surfaces of the molds.

In the operation of this invention, water is added to the tank 20 to the level of the drain 38 and heated to 200° F. by the steam pipes 55. A strong alkaline cleaning agent is added in the amount of 3 to 4 ounces avoir. for each gallon of water. The hook 109 of a suitable chain hoist (not shown) is connected to the yoke 106 to lift the frame 50 clear of the tank 20. The inner frame 90 may then be loaded by the insertion of the molds 70 within the space 125 defined by the straps 124 and 122 and lowered into the machine as shown in FIG. 1. The impeller motor 40 is operated to cause the impeller 44 to direct the liquid downwardly into the space 53 of the washing compartment 32 through the opening 35. The liquid is then forced upwardly through and between the mold cans 70 and over the top of the partition 30 back into the impeller compartment 33.

The strong alkali in solution with the washing water reacts with the meat fat and oils and causes the formation of surface foam and soap which is drawn off by the surface movement of the liquid toward the drain 38. After approximately 10 minutes of operation, the lifting frame 50 is hoisted to raise the molds 70 above the tank for drip draining and then may be removed as a unit to another location for suitable rinsing and drying. It has been that the concentration of the alkali within the tank 20 may be maintained by the addition of 10 pounds of powder per day to a tank of 400 gallon capacity for a cleaning rate of 300 molds per day.

If desired, the smaller pan assembly components, such as the spring 71, plate 74 and closing piece 75, may also be washed in this machine, if desired, simply by placing them in a basket and lowering the basket into the tank 20 for liquid circulation therethrough by the impeller motor 40 as described above.

It is therefore seen that this invention provides a machine which thoroughly washes elongated meat cooking molds economically and efficiently and which eliminates the otherwise tedious and time consuming operation of hand washing such molds.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine for washing hollow meat molds comprising, a washing liquid submerison tank, a partition dividing said tank into a washing compartment and an impeller compartment, means including said partition defining an opening connecting said compartments for the flow of washing liquid therethrough, an impeller received within said impeller compartment and arranged to direct liquid through said opening into said washing compartment, a mold frame adapted to be lowered into said washing compartment including means for supporting a plurality of said molds in spaced relation one to the other submerged in the path of liquid flow through said opening, means forming a liquid return path into said impeller compartment from said washing compartment, and surface drain means in said impeller compartment positioned in intercepting relation to said return path for the removal of foam from the liquid surface.

2. A machine for washing hollow meat molds comprising, a washing liquid submerison tank, a partition dividing said tank into a washing compartment and an impeller compartment, means including said partition defining an opening connecting said compartments for the flow of washing liquid therethrough, an impeller received within said impeller compartment and arranged to direct liquid through said opening into said washing compartment, a mold frame adapted to be lowered into said washing compartment including means for supporting a plurality of said molds in spaced relation one to the other submerged in the path of liquid flow through said opening, means forming a liquid return path into said impeller compartment from said washing compartment, and a drain in said impeller compartment positioned substantially at the level of the washing liquid for the removal of foam and soap from the liquid surface.

3. A machine for washing hollow meat molds comprising, a washing liquid submersion tank, a partition dividing said tank into a washing compartment and an impeller compartment, means including said partition defining an opening connecting said compartments for the flow of washing liquid therethrough, an impeller received within said impeller compartment and arranged to direct liquid through said opening into said washing compartment, an open mold frame adapted to be lowered into said washing compartment including means for supporting a plurality of said molds in spaced relation one to the other and to said tank and submerged in the path of liquid flow through said opening, means forming a liquid return path into said impeller compartment from said washing compartment, regulated heat exchange means within said tank for maintaining the temperature of the washing liquid therewithin at a desired level, and a drain in said impeller compartment positioned for the removal of foam and soap from the liquid surface.

4. A machine for washing meat baking molds comprising, a submerison tank having side walls and a floor, a partition dividing said tank into a washing compartment and an impeller compartment and defining an opening adjacent said floor for liquid flow from said impeller compartment into said washing compartment, an open frame receivable within said washing compartment having transversely extending members forming partitions for the spatial separation and support of said molds from each other and from said side walls, support means defining a space between the bottom of the molds in said frame and said floor for the flow of washing liquid thereunder, the top of said partition being extended above the molds in said frame and forming thereover a washing liquid return path to said impeller compartment, impeller means mounted in said impeller compartment and arranged to direct liquid downwardly through the opening defined by said partition into the space defined by said support means and upwardly through and between the molds and said walls and to return to the impeller compartment over said partition, and a surface drain in said impeller compartment of said tank positioned substantially level with the top of said partition for the removal of foam and soap carried by flow over said partition.

5. A machine for washing meat baking molds comprising, a submerison tank having side walls and a floor, a partition dividing said tank into a washing compartment and an impeller compartment and defining an opening adjacent said floor for liquid flow from said impeller compartment into said washing compartment, a frame receivable within said washing compartment having partitions for the spatial separation and support of said molds, support means defining a space between the bottom of the molds in said frame and said floor for the flow of washing liquid thereunder, the top of said partition being extended above the molds in said frame and forming thereover a washing liquid return path to said impeller compartment, impeller means mounted in said impeller compartment and arranged to direct liquid downwardly through the opening defined by said partition into the space defined by said support means and upwardly through and between the molds and to return to the impeller compartment over said partition, and drain means in communication with said impeller compartment adjacent the liquid level therein for removal of surface foam and soap carried over said partition.

References Cited in the file of this patent
UNITED STATES PATENTS

| | | |
|---|---|---|
| 843,423 | Weymar | Feb. 5, 1907 |
| 912,273 | Klenk | Feb. 9, 1909 |
| 1,329,863 | Snure | Feb. 3, 1920 |
| 1,435,212 | Connor | Nov. 14, 1922 |
| 1,510,351 | Thompson | Sept. 30, 1924 |
| 1,707,083 | Howcott | Mar. 26, 1929 |
| 1,826,015 | Morton | Oct. 6, 1931 |
| 2,548,740 | Rugh | Apr. 10, 1951 |
| 2,745,419 | Slingerland | May 15, 1956 |
| 2,827,063 | Roy | Mar. 18, 1958 |